Dec. 23, 1952 C. COHEN 2,622,687
WAVE AND TIDE MOTOR
Filed June 7, 1950 4 Sheets-Sheet 1

Charles Cohen
INVENTOR.

BY Clarence A. O'Brien
and Harvey B. Jacobson
Attorneys

Dec. 23, 1952 — C. COHEN — 2,622,687
WAVE AND TIDE MOTOR
Filed June 7, 1950 — 4 Sheets-Sheet 2

Charles Cohen
INVENTOR.

Dec. 23, 1952 C. COHEN 2,622,687
WAVE AND TIDE MOTOR
Filed June 7, 1950 4 Sheets-Sheet 3
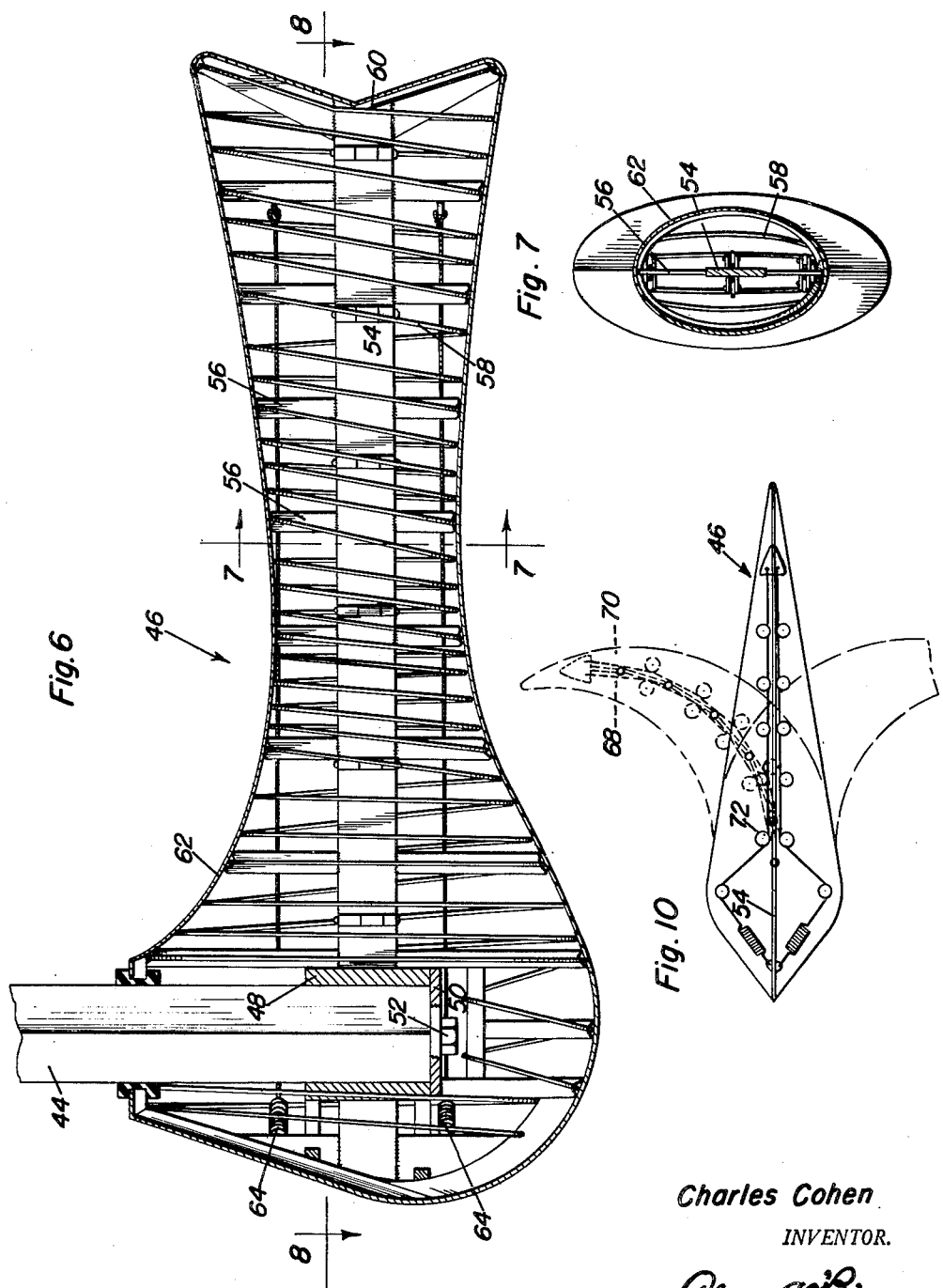
Charles Cohen
INVENTOR.

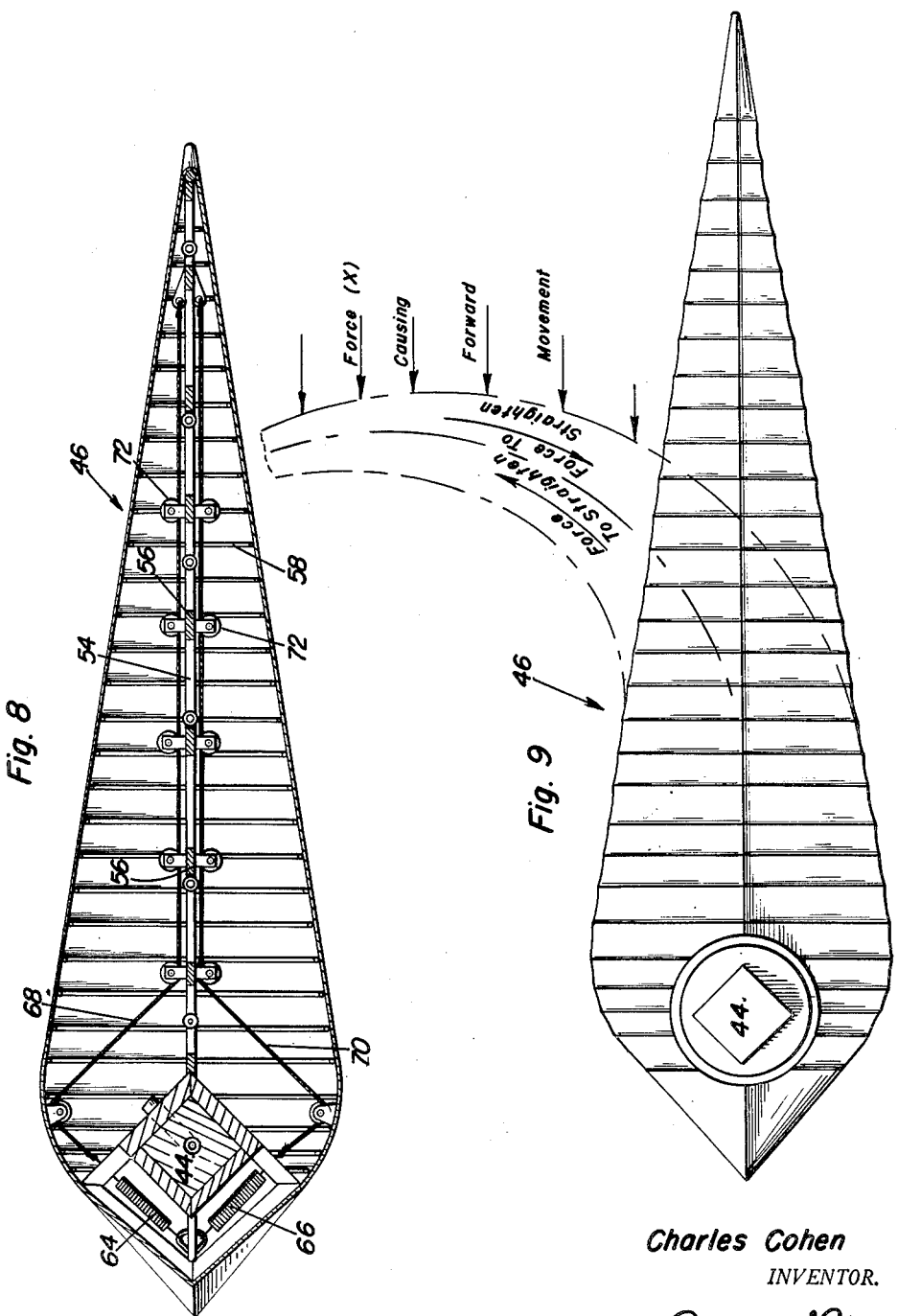

Patented Dec. 23, 1952

2,622,687

UNITED STATES PATENT OFFICE 2,622,687

WAVE AND TIDE MOTOR

Charles Cohen, Newark, N. J.

Application June 7, 1950, Serial No. 166,635

7 Claims. (Cl. 170—99)

This invention relates to a wave and tide motor for deriving power for useful purposes directly from errant, intermittent and alternating turbulent flowing waves, tides and currents.

An object of this invention is to provide effective, constant, motivating power by an assembled plurality of floats which will be rotated in a powerful one way manner by the several variating and alternating contacts imposed on its forms from variating, alternating, or intermittent water flow coming from any and all directions and use the power so obtained to drive a dynamo or other device.

A further object of this invention is to provide an assembly or assemblies of strongly built resilient and flexible floats in which each member of the assembly is enabled and forced to become laterally flexed and convexly arched bodily by and toward the prevailing currents contacting it for the moment, so as to provide and offer an automatically variating enlarged surface for rear and lateral contact to the temporarily flowing currents and an automatically reduced frontally exposed surface for frontally resisting flows and currents or inertia.

A further object of this invention is to construct durable float forms having elasticity and sea worthiness, able to withstand the buffeting of the sea, stretch, become arched and re-arched, and instantly spring back on or from contact or pull, by forming their structures from strong steel spring wire and covered with a skin of a highly elastic waterproof material which will keep out the water from inside the floats.

Still another object of this invention is to provide each float of the assembly with an inner central vertical partition of hinged upright stays forming spines designed to prevent vertical arching of the floats, thus facilitating and permitting lateral arching only.

Still another object of this invention is to provide each float longitudinally along both sides of the vertical partition with cables attached to powerful springs which, by automatic reversal of strain and stress, will automatically force floats to return to normal positions and thus, by swinging backwards, will aid forward motion.

Still another object of this invention is to facilitate vertical risings and fallings of floats with the rise and fall of tidal and wave flows by permitting free vertical slidings of vertically held shafts between rollers set up in housings on arms attached to the main center shaft and thus reduce friction stress and strain on float and motor assemblies and provide more energy for forward motion.

Still another object of this invention is to provide an overhead driving wheel set up and held horizontally under the floor of a pier out of and over the turbulent flowing water or which may be attached to a pier or set up on separate columns in the water, and which is designed to contain the several housings for the several sliding shafts and is to be rotated in a one way circular manner by the several lateral constant forward pressures and pushings applied in unison by the float borne vertical shafts, pushed along by the several floats in the water.

Still another object of this invention is to facilitate continuous motion without interruptions by providing the means which will permit the air inflation of floats while they are in motion, by providing air outlets and valves on top of center shafts to be pumped through connecting pipes and flexible hose directly to the insides of floats and which will not interfere with the normal vertical movements of shafts.

Still another object of this invention is to facilitate rotary motion by providing a ring on the top of the center shaft to which a crane or other lifting device may be attached, so that the housing can be brought at will at the desired distances from the water without interruption or interference of normal rotary motion.

Still another object of this invention is to facilitate efficient rotary motion by providing the means which will permit, if and when desired, the increase of the number of floats in an assembly; increase the number of circles, inner and outer ones, expand and extend the diameters of the circles in order that stronger and longer lasting leverages will be derived from each flow; by providing the means and facilities on the bottom of the center shafts to attach holding arms of various lengths and numbers.

Still another object of this invention to facilitate rotary motion is the introduction of perpendicular appendages at rear ends of floats structures because these appendages will act as receptive rudders when contacted with greater imparted force by flows, and as reactivated pushing rudders when pulled by inner springs and cables within floats, and thus aid in pushing floats along in oscillating forward manner.

The main object of this invention is the integration of the above mentioned parts and objects and to fit them in a set-up in which each and every part and object becomes an integral part of the whole and thus becomes available as an efficient wave and tide motor which will consistantly provide a unidirectional flow of power that may be utilized to drive a mill or other device.

It is also obvious that it is possible to lubricate and serve the hinges connecting vertical partitions within floats and roller bearings within housings with the same methods used in air inflating floats, thus avoiding unnecessary interruptions of rotary motion.

It is also obvious that it is possible to shape the floats from solid resilient materials like foamed rubber, or other material that will stretch and hold its shape, if and when such a material becomes available.

It is also obvious that the floats can be made and constructed rigidly and probably would perform well, by installing a reciprocating mechanism within the floats, which would permit a forty-five degree lateral reciprocating swing in relation to holding shafts.

Still further objects of the invention reside in the provision of a wave and tide motor that is strong, durable, highly efficient in operation, simple in construction and manufacture, capable of using floats which may be made in a variety of manners, and which are effective to furnish motor power to a mill in an inexpensive manner.

These, together with the various ancillary objects of the invention which will become apparent as the following description proceeds, are attained by this device, a preferred embodiment of which has been illustrated in the accompanying drawings, by way of example only, wherein:

Figure 6 is a vertical sectional view showing the various elements of a float in greater detail;

Figure 7 is a vertical sectional view as taken along line 7—7 of Figure 6;

Figure 8 is a horizontal sectional view as taken along line 8—8 in Figure 6;

Figure 9 is a top plan view of one of the floats comprising one element of the present invention;

Figure 10 is a schematic diagram showing the action of one of the floats and indicating the manner in which the cables urge the float back to a normal or non-deflected position.

Figure 1:
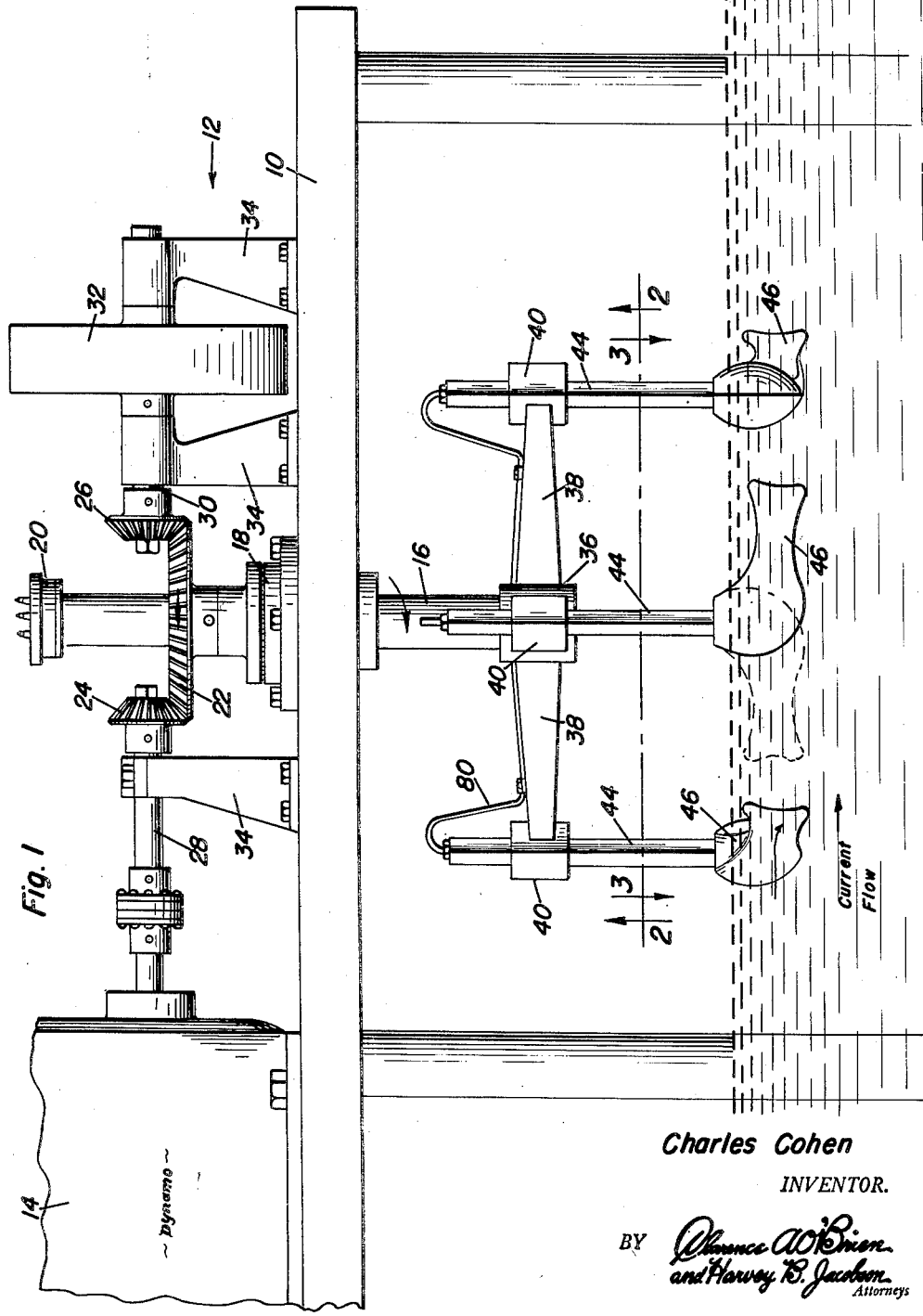
Figure 1 is a side elevational view of the wave and tide motor comprising the present invention.
Figure 2:
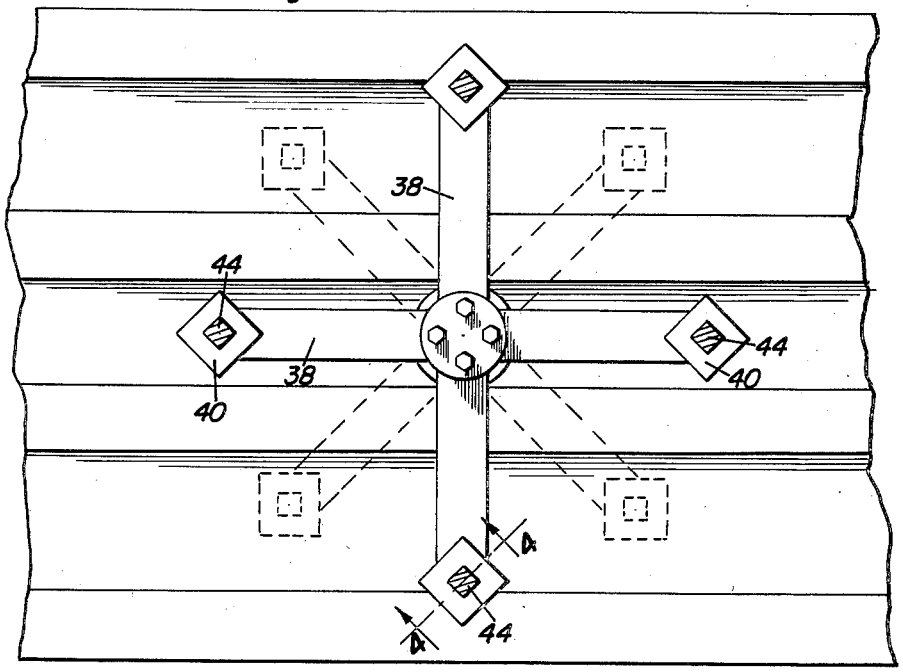
Figure 2 is a horizontal sectional view as taken along line 2—2 in Figure 1.
Figure 3:
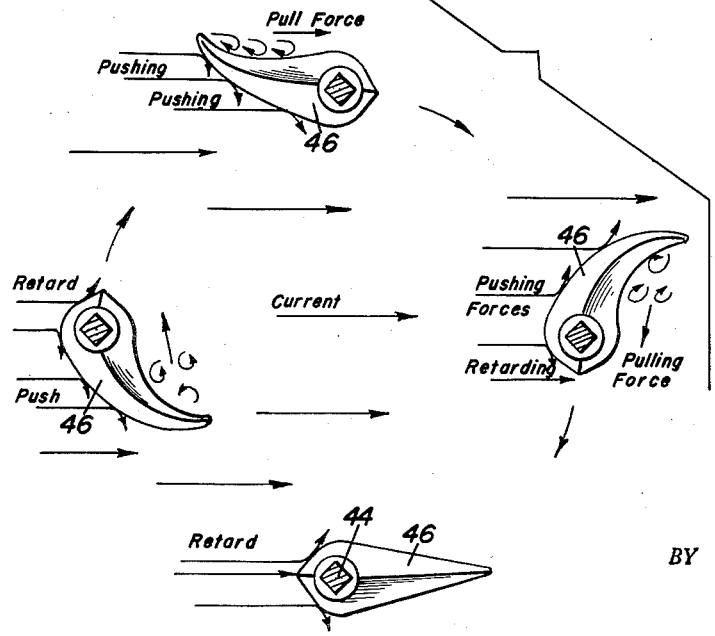
Figure 3 is a horizontal sectional view as taken along line 3—3 in Figure 1.

With continuing reference to the accompanying drawings wherein like reference numerals designate similar parts throughout the various views, reference numeral 10 generally designates a pier on which the wave and tide motor indicated at 12 is adapted to be emplaced. This wave and tide motor is adapted to drive a dynamo or other current generating device which is indicated at 14.

In particular, the wave and tide motor 12 includes a shaft 16 which is rotatably mounted in a vertical position on the pier 10 and there are provided suitable bearings 18 so as to allow rotary motion of the shaft. Secured to the top of the shaft as indicated at 20 is a ring for enabling cranes to raise and lower the shaft as is desired, while the assembly is in motion. Secured on the shaft 16 is a bevel gear 22 for transmitting such power as is obtained to the bevel gears 24 and 26 which are mounted on shafts 28 and 30 respectively. The shaft 28 turns the dynamo 14 while the shaft 30 turns a flywheel 32 for storing some of the power that is derived from the shaft 16. The shafts 28 and 30 are supported by bearing brackets 34 of convenient design.

Figure 4:
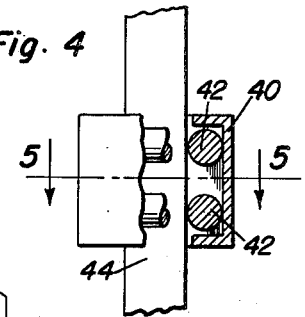
Figure 4 is a sectional detail as taken along line 4—4 in Figure 2.
Figure 5:
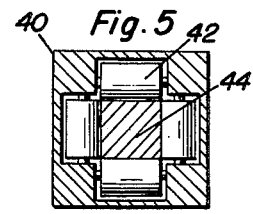
Figure 5 is a sectional detail as taken along line 5—5 in Figure 4.

At the middle of the shaft 16 there is secured a hub 36 from which arms 38, which, though shown as four, may be readily increased in number, extend in radially spaced relationship. At the ends of the arms 38 there are provided housings 40 in which there are mounted roller bearings 42, as can be best seen in Figures 4 and 5, in order that shafts 44 may be mounted for vertical sliding movement therein.

To the bottom of the shafts 44 there are secured floats 46 extending at right angles to the arms 38. These floats 46 include a central casing 48 and a base plate 50 to which the shaft is bolted as at 52. Secured to the casing 48 is a central spine member 54 formed of articulated sections which are suitably hinged together. Attached to the member 54 are spaced vertically extending frame members 56 which are preferably formed from a suitable spring steel. Also connected to the central framework member 54 by the vertically extending frame members 56 are spring steel ribs 58 of flattened spiral construction defining the shape of the float which is fish tail shaped. The framework terminates in perpendicular appendages as indicated at 60 in order to perform as alternating receptive and reactive rotors to the varying attacks of the alternating flows of current.

A skin 62 of an elastic waterproof material is provided and attached to the ribs 58. There are attached within the housing or casing 48 one end of springs 64 and 66 to which there are attached cables 68 and 70 which extend longitudinally through the float and are attached to frame members 56 adjacent the rotor end of the float. Suitable pulleys 72 are provided for permitting longitudinal motion of the cables.

As can be readily seen, when the float is deflected laterally as shown in Figure 10 there will be tension on the cables 68 and 70 with more tension being on the cable 70 so as to continuously urge the float to return to its initial undeflected position.

As can be readily seen, the floats 46 are arranged in the assembly and the waves or tide will cause the floats to actuate the main shaft 16 in a powerful constant one-way rotary manner. A circular assembly of such conceived flexible floats will be operated in a powerful constant one-way rotary manner by contending, intermittent, alternating current, wave and tide flows, because of the following pertinent reasons:

Although the flows in the periphery of the circular assembly may be intermittent, alternate frequently, vary in intensity and come from varying directions, momentary superior flows always prevail in that area and the varying temporary superior flows contacting the floats of the assembly from any and all directions will, with its temporary superior impacts on the lateral sides of floats and perpendicular appendages, impart greater press and force on these elongated parts and rudders than on its prows and also cause each float so engaged to become temporarily, for the duration, convexly arched by and toward the particular flow contacting it for the moment and the continuations of the temporary flows flowing past tapered arched floats and behind rudders will continue to press on convexly arched sides facing flows and also pull on concave arched sides and hence force whole assembly of floats to proceed and track in a path of least resistance, that is, head on, and as each float is being firmly held in circular assembly by separate vertical shafts 44 in housings 40 of an overhead horizontal driving wheel, the whole assembly of floats and motor will be forced to rotate in a powerful one-way direction.

When the floats of the assembly during its rotary motion, singly or collectively are brought by the prevailing current or currents in position or positions of intermittent, alternating variating thrusts, impacts and pressures and directions of impacts or the temporary superior current and wave flows temporarily ebb or flow past the assembly, temporarily equalizing or altering direction or directions of applied impacts on forms of each or several forms of floats; the tensely arched forms will be instantly, automatically and forcibly brought to normal shape by the release of tension in spring steel ribbed bodies and the pulls exerted within the forms by the longitudinal cables and springs, thus causing instant, constant, automatic, successive oscillating counteraction of rotary forward motion.

Hence we get instant constant, direct, free, powerful rotary motion, caused by intermittent alternating impulses and impacts of temporary wave, current and tide flows, imparted on each and every angle of the several floats of the assembly as they become alternatively, successively, singly or collectively variantly exposed to the greater impacts of the prevalent greater flows while in motion; and instant, automatic, resulting, consequent, constant, oscillating counteraction, as each and every float of the assembly is singly or collectively released or reversed alternately to varying surface exposure impacts by the momentary prevalent currents, by the instant automatic counter stroke and thrust of straightening and reverse arching of the float forms.

The oscillating mechanisms of this invention can be favorably compared with other oscillating mechanisms like clocks, steam, gas etc.; the alternating flows acting as driving forces and rearching floats as counter resulting driving forces, and coming from a periphery toward a center pivot that kind of power application should prove to become very effective.

In order to provide buoyancy for the floats, there is provided a suitable air valve in these floats to which there are connected air lines 80 carried by the arms 38 and extending downwardly within the shafts 44. Obviously, the air lines 80 are formed from flexible tubular material such as rubber.

Since from the foregoing the construction and advantages of this wave and tide motor are readily apparent, further description is believed to be unnecessary.

However, since numerous modifications will readily occur to those skilled in the art after a consideration of the foregoing specification and accompanying drawings, it is not intended to limit the invention to the exact embodiment shown and described, but all suitable modifications and equivalents may be readily resorted to which fall within the scope of the appended claims.

Having described the invention, what is claimed as new is:

1. A wave and tide motor comprising a plurality of spaced flexible floats, means adjustably connecting said floats to a main drive shaft, and means connecting said drive shaft to a current generating device, said first recited means including square shafts secured to said floats, arms attached to said main drive shaft, said square shafts vertically slidably engaging said arms frontally.

2. A wave and tide motor comprising a plurality of spaced flexible floats, means adjustably connecting said floats to a main drive shaft, means connecting said drive shaft to a current generating device, said first recited means including square shafts secured to said floats, arms attached to said main drive shaft, said square shafts vertically slidably engaging said arms frontally, said floats including a plurality of spaced frame members, flexible cables connecting said frame members, and a flexible skin encompassing said frame members and said cables.

3. A wave and tide motor comprising a plurality of spaced laterally flexible floats, means adjustably connecting said floats in fixed directional relation to a main drive shaft, means connecting said drive shaft to a power utilizing device, said first recited means including square shafts secured to said floats, arms attached to said main drive shaft, said square shafts vertically slidably engaging said arms frontally, said second recited means including a bevel gear on said main shaft, said bevel gear engaging a bevel gear secured to a shaft driving said device.

4. A wave and tide motor comprising a plurality of spaced flexible floats, means adjustably connecting said floats to a main drive shaft, means connecting said drive shaft to a current generating device, said first recited means including square shafts rigidly secured to said floats, arms attached to said main drive shaft, said square shafts vertically slidably engaging said arms frontally, said floats including a plurality of spaced vertical frame members, flexible cables connected to said frame members, and a flexible skin encompassing said frame members and said cables, said connecting means including a bevel gear on said main shaft, said bevel gear engaging a bevel gear secured to a shaft driving said current generating device.

5. A wave and tide motor comprising a plurality of spaced flexible floats, means adjustably connecting said floats to a main drive shaft, means connecting said drive shaft to a current generating device, said first recited means including square shafts rigidly secured to said floats, arms attached to said main drive shaft, said square shafts vertically slidably engaging said arms frontally, said floats including a plurality of spaced frame members, flexible cables connected to said frame members, and a flexible skin encompassing said frame members and said cables, said connecting means including a bevel gear on said main shaft, said bevel gear engaging a bevel gear secured to a shaft driving said current generating device, another bevel gear engaging the bevel gear on said main shaft, said another bevel gear being secured to a shaft on which a flywheel is mounted.

6. A motor for converting the energy of errant flowing currents into constant unidirectional power comprising a vertical shaft, a plurality of laterally extending arms secured on said shaft, square shafts secured in vertically slidable relation to said arms, longitudinally tapered, laterally flexible floats having the front end thereof rigidly fixed to said square shafts, each of said floats including a longitudinally extending articulated spine member, a plurality of vertical frame members, secured to said spine member, spring wire ribs secured to said vertical frame members, said ribs being a flattened spiral shape, a flexible water proof skin mounted on said ribs, resilient means secured to and anchored at each end of said spine member.

7. A wave motor comprising a central shaft, a plurality of laterally extending arms on said central shaft, square shafts vertically slidable on said arms, laterally flexible floats rigidly secured on said square shafts at right angles to said arms, each of said floats including a longitudinally extending spine member, a plurality of vertical frame members secured to said spine member, a flexible member secured at each side of said spine member and anchored adjacent each end of said spine member, resilient means secured in said flexible members and stretched by lateral flexing of said float.

CHARLES COHEN.

REFERENCES CITED

The following references are of record in the file of this patent:

UNITED STATES PATENTS

| Number | Name | Date |
|---|---|---|
| 621,719 | Shann et al. | Mar. 21, 1899 |
| 643,176 | Wiese | Feb. 13, 1900 |
| 863,033 | Martin | Aug. 13, 1907 |
| 1,033,476 | Schulze | July 23, 1912 |
| 2,477,691 | Griffin | Aug. 2, 1949 |